(12) United States Patent  
Muller

(10) Patent No.: US 12,496,547 B2
(45) Date of Patent: Dec. 16, 2025

(54) PROCESSES FOR TREATING OFF-GAS IN AN ACETIC ACID PRODUCTION UNIT

(71) Applicant: Ineos Acetyls UK Limited, Lyndhurst (GB)

(72) Inventor: John Peter Eric Muller, Hull (GB)

(73) Assignee: Ineos Acetyls UK Limited, Lyndhurst (GB)

( * ) Notice: Subject to any disclaimer, the term of this patent is extended or adjusted under 35 U.S.C. 154(b) by 416 days.

(21) Appl. No.: 18/026,627

(22) PCT Filed: Sep. 6, 2021

(86) PCT No.: PCT/EP2021/074458
§ 371 (c)(1),
(2) Date: Mar. 16, 2023

(87) PCT Pub. No.: WO2022/058189
PCT Pub. Date: Mar. 24, 2022

(65) Prior Publication Data
US 2023/0338888 A1    Oct. 26, 2023

(30) Foreign Application Priority Data
Sep. 17, 2020   (GB) ...................... 2014657

(51) Int. Cl.
*B01D 53/14* (2006.01)
*B01D 53/18* (2006.01)
*B01D 53/75* (2006.01)

(52) U.S. Cl.
CPC ......... *B01D 53/1412* (2013.01); *B01D 53/14* (2013.01); *B01D 53/1475* (2013.01);
(Continued)

(58) Field of Classification Search
CPC ..................................................... B01D 53/14
See application file for complete search history.

(56) References Cited

U.S. PATENT DOCUMENTS 6,143,930 A    11/2000  Singh et al.
6,211,405 B1    4/2001  Cheung et al.
(Continued)

FOREIGN PATENT DOCUMENTS

CN           1803254 A       7/2006
CN       106715377 A  *  5/2017  ............. C07C 51/12
(Continued)

OTHER PUBLICATIONS

Search Report of UK Patent Application No. GB2014657.7, Feb. 26, 2021, 1 page.
(Continued)

*Primary Examiner* — Robert A Hopkins
(74) *Attorney, Agent, or Firm* — McDonnell Boehnen Hulbert & Berghoff LLP

(57) ABSTRACT

The present disclosure relates generally to processes for scrubbing an off-gas stream of an acetic acid production unit. In one aspect, a process includes introducing the off-gas stream to the absorption column; introducing to the absorption column, a methanol stream at a first flow rate, the methanol stream having a first temperature at the liquid inlet, the first temperature being at least 18° C. (e.g., at least 20° C., or at least 22° C.); in the absorption column, contacting the off-gas stream with the methanol stream; through a liquid outlet of the one or more liquid outlets, withdrawing a first liquid effluent from the absorption column, the first liquid effluent comprising methanol and methyl iodide; and through the vapour outlet, withdrawing a vapour effluent from the absorption column.

21 Claims, 1 Drawing Sheet

(52) U.S. Cl.
CPC ..... *B01D 53/1487* (2013.01); *B01D 53/1493* (2013.01); *B01D 53/18* (2013.01); *B01D 53/75* (2013.01); *B01D 2252/2021* (2013.01); *B01D 2257/2068* (2013.01); *B01D 2257/504* (2013.01); *B01D 2258/02* (2013.01)

(56) References Cited

U.S. PATENT DOCUMENTS

| | | |
|---|---|---|
| 6,339,171 B1 | 1/2002 | Singh et al. |
| 9,233,907 B1 | 1/2016 | Shaver et al. |
| 2006/0281944 A1 | 12/2006 | Hosono et al. |
| 2008/0293967 A1 | 11/2008 | Scates et al. |
| 2009/0270651 A1 | 10/2009 | Zinobile et al. |

FOREIGN PATENT DOCUMENTS

| | | |
|---|---|---|
| EP | 0161874 B2 | 7/1992 |
| EP | 0728727 B1 | 3/1999 |
| EP | 2937329 A1 | 10/2015 |
| JP | 2004300072 A | 10/2004 |
| WO | 2004/080941 A2 | 9/2004 |
| WO | 2009/134332 A2 | 11/2009 |
| WO | 2015/193328 A1 | 12/2015 |

OTHER PUBLICATIONS

International Search Reported and Written Opinion of International Patent Application No. PCT/EP2021/074458, mailed Nov. 26, 2021, 18 pages.

* cited by examiner

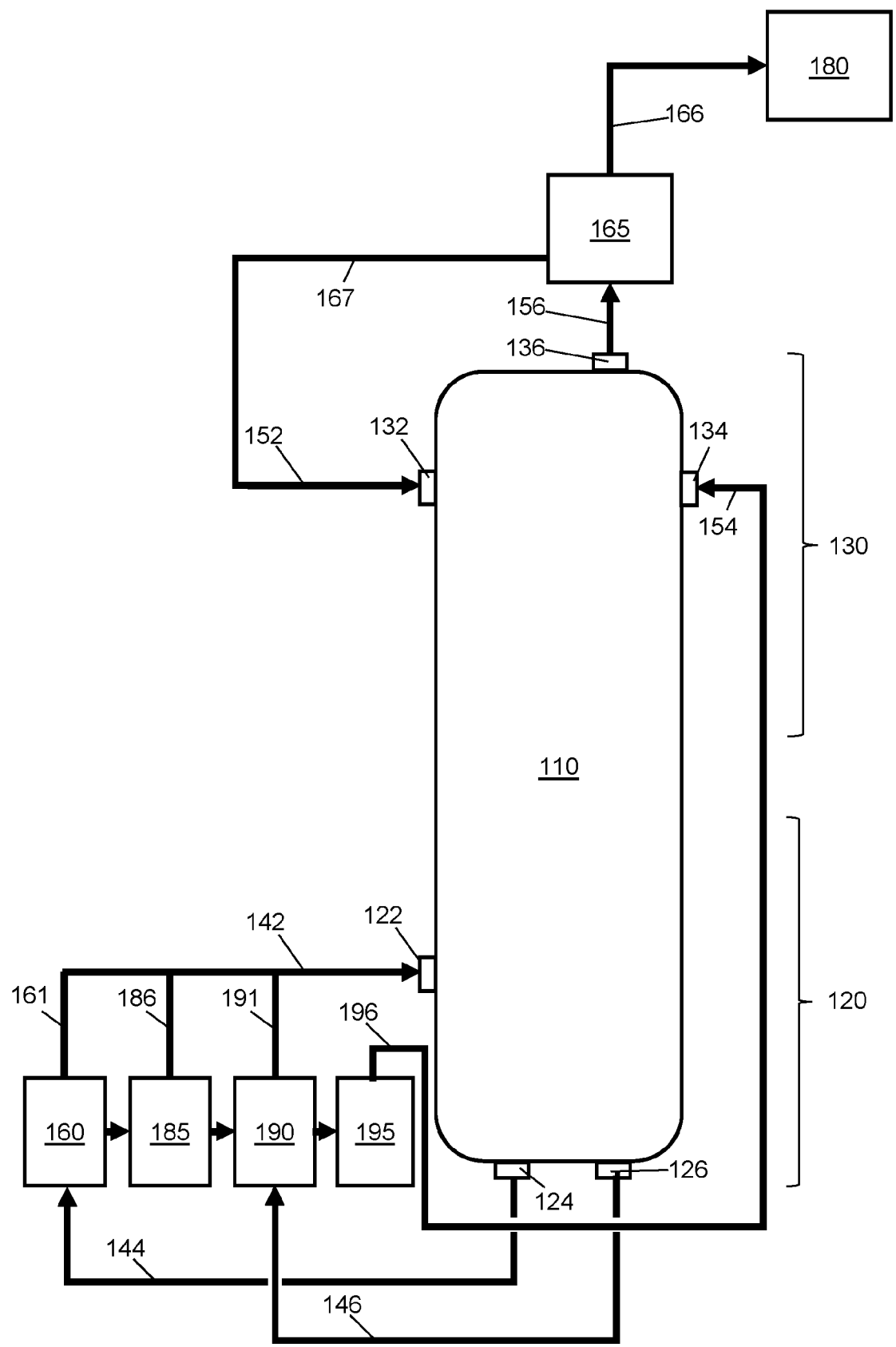

PROCESSES FOR TREATING OFF-GAS IN AN ACETIC ACID PRODUCTION UNIT

This application is a U.S. national phase application of International Patent Application no. PCT/EP2021/074458 filed on Sep. 6, 2021, which claims the benefit of UK Provisional Patent Application no. 2014657.7, filed on Sep. 17, 2020, each of which is incorporated by reference in its entirety.

BACKGROUND OF THE DISCLOSURE

1. Field

The present disclosure relates generally to processes for off-gas treatment useful in the production of acetic acid.

2. Technical Background

Commercially, acetic acid has been manufactured for many years by carbonylating methanol with carbon monoxide in the presence of a Group VIII carbonylation catalyst. Typically, carbon monoxide is contacted with methanol in the presence of a rhodium or an iridium homogeneous or heterogeneous carbonylation catalyst, methyl iodide and water in one or more reaction zones. In general, acetic acid product may be recovered by withdrawing crude acetic acid product from the reactor and separating the acetic acid product in one or more flash and/or distillation stages from the other components, such as the Group VIII metal carbonylation catalyst, methyl iodide, methyl acetate, and water. Acetic anhydride is often provided as a co-product.

In the process of manufacturing acetic acid and/or co-manufacture of acetic acid and acetic anhydride, off-gas is typically withdrawn at several stages of the process, such as from one or more of the reactor and distillation stages. Off-gas is removed to keep the standing concentration of undesirable gaseous reaction by-products and inert gases to an acceptable level.

The exact composition of off-gas will vary depending on the specific carbonylation process conditions employed but typically it will contain carbon monoxide, inert gases and reaction by-product gases, iodide compounds, mainly methyl iodide, and it may also contain low levels of methyl acetate, acetic acid and water.

Off-gas is typically processed by scrubbing it with a suitable scrubbing solvent to recover valuable components, such as methyl iodide, which may be ultimately returned to the reactor. The scrubbed off-gas comprising inert and by-product gases is usually burned. A variety of scrubbing solvents may be employed, for example acetic acid or methanol. In such scrubbing processes, methyl iodide becomes absorbed in the scrubbing solvent and off-gas containing a reduced amount of methyl iodide is removed from the scrubbing unit, typically as an overhead. One conventional process, described in International Patent Application Publication no. 2015/193328 uses a methanol absorption column and an acetic acid absorption column positioned in series. In such conventional systems, these columns can be used to ensure that the level of methyl iodide is maintained at a low level (e.g., 35 parts per million by volume (ppmv)) in the overhead stream sent to flare. The acetic acid absorption column can be used during start-up and shut down while the plant awaits methanol availability. The methanol absorption column performs most of the methyl iodide scrubbing during normal operation; during such normal operation, the liquid flow through the acetic acid absorption column can be reduced to a low, "tick over", flow rate, to be available on demand while allowing most of the acetic acid product stream to be passed into a light ends column.

However, it remains desirable to provide alternative methods of scrubbing off-gas streams generated in production processes for the manufacture of acetic acid, and in particular off-gas streams generated in production processes for the manufacture of acetic acid by the carbonylation of methanol.

SUMMARY

In one aspect, the disclosure provides a process for scrubbing an off-gas stream comprising carbon monoxide and methyl iodide in an absorption column of an acetic acid production unit, the absorption column comprising
  a bottom section comprising a feed inlet and one or more liquid outlets; and
  above the bottom section, a top section comprising one or more liquid inlets and
  a vapour outlet;
the process comprising
  through the feed inlet, introducing the off-gas stream to the absorption column;
  through a liquid inlet of the one or more liquid inlets, introducing a methanol stream at a first flow rate, the methanol stream having a first temperature at the liquid inlet,
  the first temperature being at least 18° C. (e.g., at least 20° C., or at least 22° C.);
  in the absorption column, contacting the off-gas stream with the methanol stream;
  through a liquid outlet of the one or more liquid outlets, withdrawing a first liquid effluent from the absorption column, the first liquid effluent comprising methanol and methyl iodide; and
  through the vapour outlet, withdrawing a vapour effluent from the absorption column.

The vapour effluent preferably comprises at most 500 ppmv (parts per million by volume)(e.g., at most 350 ppmv, or at most 200 ppmv, or at most 100 ppmv) methyl iodide.

Other aspects of the disclosure will be apparent to those skilled in the art in view of the description that follows.

BRIEF DESCRIPTION OF THE DRAWINGS

FIG. 1 is a schematic diagram of a process of the disclosure.

DETAILED DESCRIPTION

The present inventors have noted that under non-steady state conditions, such as at plant start-up, plant shut-down or plant trips/upsets, it is frequently the case in acetic acid production processes that the supply of methanol to the reactor and/or scrubbing units becomes limited and may be ceased entirely. This is disadvantageous for those acetic acid production processes which use methanol as an off-gas scrubbing solvent. There exist switching systems, such as those described in International Patent Application 2009/134332, that provide for the use of different scrubbing solvents in a single scrubbing column, which can reduce capital requirements and operating costs.

In general, the efficiency with which off-gas is scrubbed with a solvent is maximized by using a scrubbing solvent which has been cooled prior to use. A scrubbing solvent can be cooled, for example, by passing it through a heat exchange unit configured to reduce the temperature of the solvent prior to its use in a scrubbing unit. Conventionally, both acetic acid and methanol are reduced in temperature prior to scrubbing an off-gas to improve their scrubbing efficiency. For example, as acetic acid freezes at 16.7° C., a somewhat higher temperature (e.g., ~24° C.) is often used as a setpoint for the acetic acid feed to an absorption column to address the risk of freezing while ensuring enough scrubbing efficiency to assure methyl iodide removal under a variety of conditions. In contrast, methanol has a freezing point of close to −100° C. and thus freezing is not a primary concern. Instead, the setpoint for a methanol feed to an absorption column is typically set at a low but practical value (e.g., ~5° C.) based on other system parameters, e.g., the temperature of a cooling system.

The present inventors have noted that in systems using a single absorption column for both methanol and acetic acid scrubbing solvents, when switching from methanol to acetic acid it is necessary to wait for the absorption column to warm up to above the freezing point of acetic acid, to prevent freezing of acetic acid in the column. Acetic acid can be frozen in the column by the packing and materials of the column themselves, having been cooled by contact with the much cooler methanol scrubbing solvent. Freezing of acetic acid in the absorption column is highly undesirable, as it can reduce scrubbing efficiency or even cause a complete loss of scrubbing, thereby allowing methyl iodide to be released to the atmosphere.

The present inventors have surprisingly determined that methanol scrubbing operations can be performed at a substantially higher temperature than that conventionally used. Notably, the methanol scrubbing can be performed at a temperature above the freezing point of acetic acid, which means that there is no risk of acetic acid freezing in the column during switching of solvents.

In various aspects, the processes of the disclosure provide for scrubbing an off-gas stream in an acetic acid production unit. Specifically, one aspect of the disclosure is a process for scrubbing an off-gas stream comprising carbon monoxide and methyl iodide in an absorption column of an acetic acid production unit. The absorption column includes:
  a bottom section comprising a feed inlet and a liquid outlet; and
  above the bottom section, a top section comprising one or more liquid inlets and
  a vapour outlet.
The process includes
  through the feed inlet, introducing the off-gas stream to the absorption column;
  through one of the one or more liquid inlets, introducing a methanol stream at a first flow rate, the methanol stream having a first temperature at the inlet, the first temperature being at least 18° C. (e.g., at least 20° C., or at least 22° C., or at least 24° C.);
  in the absorption column, contacting the off-gas stream with the methanol stream: through a liquid outlet of the one or more liquid outlets, withdrawing a first liquid effluent from the absorption column, the first liquid effluent comprising methanol and methyl iodide; and
  through the vapour outlet, withdrawing a vapour effluent from the absorption column.
The vapour effluent preferably comprises at most 500 ppmv (e.g., at most 350 ppmv, or at most 200 ppmv, or at most 100 ppmv) methyl iodide. (The vapour effluent is the scrubbed off-gas and generally comprises carbon monoxide, and also carbon dioxide and nitrogen.)

Accordingly, one embodiment of the disclosure is described with respect to FIG. 1. Acetic acid production unit 100 includes an absorption column 110, which includes a bottom section 120 having a feed inlet (or off-gas inlet) 122 and one or more liquid outlets (here liquid outlets 124 and 126); and above the bottom section, a top section 130 having one or more liquid inlets (here liquid inlets 132 and 134) and a vapour outlet 136. Through the feed inlet, an off-gas stream 142 is introduced to the absorption column. Through one of the one or more liquid inlets, here through liquid inlet 132, is introduced a methanol stream 152, having a first temperature at the liquid inlet. Notably, the first temperature is at least 18° C. In the absorption column, the off-gas stream is contacted with the methanol stream, thereby scrubbing the off-gas stream with methanol. Through a liquid outlet of the one or more liquid outlets, here liquid outlet 124, a first effluent 144 comprising methanol and methyl iodide is withdrawn from the absorption column. Through the vapour outlet 136 is withdrawn a vapour effluent 156 i.e., the scrubbed off-gas.

The off-gas stream can be provided from any of a variety of operations within the acetic acid production unit. For example, in certain embodiments as otherwise described herein, the off-gas stream includes at least a portion of one or more of vapour-phase effluent of a separation zone, a light-ends recovery zone of the acetic acid production unit, and a reaction zone of the acetic acid production unit. This is shown in the embodiment of FIG. 1; a vapor phase effluent 186 of flash separation zone 185; a vapour-phase effluent 191 of light-ends recovery zone 190; an and a vapour-phase effluent 161 of reaction zone 160 provide the off-gas stream 142 introduced to the absorption column 110.

The first temperature (i.e., the temperature of the methanol stream at the liquid inlet) is higher than the freezing point of acetic acid. Thus, the packing and other structures of the column will be, even at their coldest, above the freezing point of acetic acid, and thus if acetic acid is admitted to the column for use as a scrubbing solvent (e.g., in cases where sufficient methanol stream is not available), it will not freeze in the column. In certain embodiments as otherwise described herein, the first temperature is at least 20° C., e.g., at least 22° C., or at least 24° C. In certain embodiments as otherwise described herein, the first temperature is in the range of 18° C. to 35° C., e.g., in the range of 20° C. to 35° C., or in the range of 22° C. to 35° C., or in the range of 24° C. to 35° C. In certain embodiments as otherwise described herein, the first temperature is in the range of 18° C. to 30° C., e.g., 20° C. to 30° C., or 22° C. to 30° C., or 24° C. to 30° C. In certain embodiments as otherwise described herein, the first temperature is in the range of 18° C. to 28° C., e.g., 20° C. to 28° C., or 22° C. to 28° C.

The first liquid effluent includes methanol and methyl iodide (scrubbed from the off-gas stream). This stream can be transferred to the reaction zone of the acetic acid production unit, for use as a reactant in the carbonylation of methanol with carbon monoxide over a zeolite catalyst. For example, in the embodiment of FIG. 1, first liquid effluent 144 is transferred to the reaction zone 160. The first liquid effluent transferred to the reaction zone of the acetic acid production unit can include, in embodiments, at most 250 ppmv (e.g., at most 200 ppmv, or at most 150 ppmv, or at most 100 ppmv, or at most 50 ppmv, or at most 25 ppmv) acetic acid. For example, in certain desirable embodiments, the first liquid effluent transferred to the reaction zone of the acetic acid product unit is substantially free from acetic acid.

Surprisingly, the present inventors have determined that even at much higher temperatures than conventionally contemplated, methanol can be used to effectively scrub methyl iodide from an off-gas stream in an acetic acid production unit. In certain embodiments as otherwise described herein, the vapour effluent (withdrawn while introducing the methanol stream to the absorption column) has at most 500 ppmv methyl iodide, or at most 350 ppmv methyl iodide, or at most 200 ppmv methyl iodide, or at most 100 ppmv methyl iodide, or even at most 50 ppmv methyl iodide.

The higher temperature of the methanol scrubbing solvent can, however, lead to a relatively higher concentration of methanol in the vapour effluent than is conventional. A heat exchanger (e.g., an overheads condenser) can be used to separate the vapour effluent, providing a vapour fraction and a liquid fraction including methanol. In the embodiment of FIG. 1, vapour effluent 156 is condensed in overheads condenser 165, providing a vapour fraction 166 and a liquid fraction 167 which comprises methanol. The liquid fraction can, as shown in FIG. 1, be part of the methanol stream introduced to the absorption column, such that the methanol stream includes at least a portion of the liquid fraction comprising methanol. The vapour fraction can, as shown in FIG. 1, be transferred a combustion system (180) and burned therein (e.g., as a flare). In certain desirable embodiments, the vapour fraction comprises at most 2.5 wt. % (e.g., at most 2.25 wt. %, or at most 2.0 wt. %, or at most 1.75 wt. %, or at most 1.5 wt. %) methanol.

In many cases, it will be desirable to use acetic acid for scrubbing before using methanol for scrubbing. This is often the situation at process start-up, when there may not be sufficient methanol available for scrubbing. Thus, in certain embodiments as otherwise described herein, the process further includes, before introducing the methanol stream to the absorption column, through the feed inlet, transferring the off-gas stream to the bottom section of the absorption column;
through a liquid inlet of the one or more liquid inlets, transferring an acetic acid stream to the top section of the absorption column at a second flow rate, the acetic acid stream having a second temperature at the inlet; and
in the absorption column, contacting the off-gas stream with the acetic acid stream.

The method further includes, after a first time period of contacting the off-gas stream with the acetic acid stream, decreasing the flow of the acetic acid stream (e.g., to a flow of about zero) and introducing the methanol stream to the absorption column, to transition from acetic acid to methanol.

Preferably the transition is such that the weight ratio of methanol to acetic acid in the absorption column is at least 500:1 while contacting the off-gas stream with the methanol stream. The second temperature is at least 18° C.

Thus, in certain embodiments as otherwise described herein (and as identified in the system of FIG. 1), before methanol is introduced to the column, acetic acid is used as the scrubbing solvent. Off-gas stream 142 is introduced to the bottom section 120 of the absorption column 110 through feed inlet 122. Through a liquid inlet (which can be the same or different as the liquid inlet through which the methanol stream is later introduced), an acetic acid stream is introduced to the top section of the absorption column at a second flow rate. In the embodiment of FIG. 1, acetic acid stream 154 is introduced to the top section 130 of the absorption column 110 through liquid inlet 134. The acetic acid stream has a second temperature at the liquid inlet; notably, this second temperature is at least 18° C. The off-gas stream is contacted with the acetic acid stream in the absorption column 110. After a first time period of contacting the off-gas stream with the acetic acid stream, the scrubbing solvent can be switched from acetic acid to methanol. Thus, the flow of the acetic acid stream can be decreased (e.g., to a flow of about zero), and the methanol stream can be introduced to the column as described above. With the switch in solvents being introduced to the column, the liquid content of the absorption column can be changed to be mostly methanol, e.g., such that after a transition between acetic acid and methanol, a weight ratio of methanol to acetic acid in the absorption column is at least 500:1 (e.g. at least 1,500:1, or at least 4,000:1) while contacting the off-gas stream with the methanol stream. This transition time is desirably relatively fast; the person of ordinary skill in the art can switch between introducing the acetic acid stream and introducing the methanol stream in a matter of minutes or even seconds. However, depending on the volume of the absorption column, it may take somewhat longer for the new, high ratio of methanol to acetic acid to be established.

The second temperature (i.e. the temperature of the acetic acid stream at the liquid inlet) is higher than the freezing point of acetic acid. In certain embodiments as otherwise described herein, the second temperature is at least 20° C., e.g., at least 22° C., or at least 24° C. In certain embodiments as otherwise described herein, the second temperature is in the range of 18° C. to 50° C., e.g., in the range of 18° C. to 45° C., or 18° C. to 40° C., or 20° C. to 50° C., or 20° C. to 45° C., or 20° C. to 40° C., or 22° C. to 50° C., or 22° C. to 45° C., or 22° C. to 40° C., or 24° C. to 50° C., or 24° C. to 45° C., or 24° C. to 40° C.

The second temperature (i.e. of the acetic acid stream) can conveniently be set to be the about the same as or higher than the first temperature (i.e., of the methanol stream). For example, in certain embodiments as otherwise described herein, the second temperature differs from first temperature by at most 5° C. (e.g., at most 3.5° C., or at most 2° C.). Of course, the process can also be advantageously run with higher temperature differences; in other embodiments, the second temperature is 5-25° C. (e.g., 7.5-25° C., or 10-25° C., or 15-25° C., or 5-15 C, or 7.5-15° C., or 10-15° C.) higher than the first temperature.

In certain embodiments as otherwise described herein, while introducing the acetic acid stream to the absorption column, a second liquid effluent is withdrawn from the absorption column through a liquid outlet of the one or more liquid outlets. This liquid outlet can be the same or different as the liquid outlet through which the first liquid effluent is withdrawn; when it is the same, the person of ordinary skill in the art can provide the system with valves to allow for the second liquid effluent to be conducted to a part of the system different from the first liquid effluent. The second liquid effluent includes acetic acid and methyl iodide (i.e., scrubbed from the off-gas stream). In the system of FIG. 1, a second liquid effluent 146 is withdrawn from liquid outlet 126. The second liquid effluent can be transferred to a light-ends recovery zone (190 in FIG. 1) of the acetic acid production unit, where acetic acid can be recovered as a product. In certain such embodiments, the second liquid effluent transferred to the light-ends recovery zone of the acetic acid production unit has at least 25 ppmv (e.g., at least 50 ppmv, or at least 100 ppmv, or at least 150 ppmv, or at least 200 ppmv, or at least 250 ppmv) acetic acid.

In certain embodiments as otherwise described herein, while the acetic acid stream is introduced to the absorption column, a vapour effluent is withdrawn through the vapour outlet. This vapour effluent withdrawn while introducing the acetic acid stream to the absorption column in certain desirable embodiments includes at most 500 ppmv methyl iodide. In certain desirable embodiments, it includes at most 350 ppmv methyl iodide, at most 200 ppmv methyl iodide, at most 100 ppmv methyl iodide, or even at most 50 ppmv methyl iodide.

The acetic acid stream can be provided from a variety of sources. In certain embodiments, the acetic acid stream includes at least a portion of an overhead stream of a heavy ends column of the acetic acid production unit. For example, as shown in FIG. 1, the acetic acid stream 154 can be provided from an overhead stream 196 of a heavy ends column 195.

In many cases, it will be desirable to use acetic acid for scrubbing after using methanol for scrubbing. This is often the situation during non-steady-state operation, when there may not be sufficient methanol available for scrubbing, such as during unit shutdown or trips/upsets in the production process. Thus, in certain embodiments as otherwise described herein, the process further includes, after introducing the methanol stream to the absorption column,
  decreasing the flow rate of methanol transferred to the absorption column (e.g., to zero);
  through the feed inlet, transferring the off-gas stream to the bottom section of the absorption column;
  through a liquid inlet of the one or more liquid inlets, transferring an acetic acid stream to the top section of the column at a third flow rate, the acetic acid stream having a third temperature at the inlet; and
  in the absorption column, contacting the off-gas stream with the acetic acid stream.

Preferably, after the transition from methanol to acetic acid, the weight ratio of methanol to acetic acid in the absorption column is no more than 1:500 (e.g., no more than 1:1500 or no more than 1:4000) while contacting the off-gas stream with the acetic acid stream. The third temperature is at least 18° C.

Thus, in certain embodiments as otherwise described herein (and as identified in the system of FIG. 1), after methanol is introduced to the column, acetic acid is used as the scrubbing solvent. Off-gas stream 142 is introduced to the bottom section 120 of the absorption column 110 through feed inlet 122. Through a liquid inlet (which can be the same or different as the liquid inlet through which the methanol stream has been introduced), an acetic acid stream is introduced to the top section of the absorption column at a third flow rate. In the embodiment of FIG. 1, acetic acid stream 154 is introduced to the top section 130 of the absorption column 110 through liquid inlet 134. The acetic acid stream has a third temperature at the liquid inlet; notably, this third temperature is at least 18° C. The off-gas stream is contacted with the acetic acid stream in the absorption column 110. After introducing the methanol to the absorption column the scrubbing solvent can be switched from methanol to acetic acid. Thus, the flow of the methanol stream can be decreased, e.g., to a flow of about zero, and the acetic acid stream can be introduced to the column as described above. With the switch in solvents being introduced to the column, the liquid content of the absorption column can be changed to be mostly acetic acid, e.g., such that after a transition between acetic acid and methanol, a weight ratio of methanol to acetic acid in the absorption column is no more than 1:500 (e.g. no more than 1:1,500, or no more than 1:4,000) while contacting the off-gas stream with the acetic acid stream. This transition time is desirably relatively fast; the person of ordinary skill in the art can switch between introducing the methanol stream and introducing the acetic acid stream in a matter of minutes or even seconds. However, depending on the volume of the absorption column, it may take somewhat longer for the new, low ratio of methanol to acetic acid to be established.

The third temperature (i.e., the temperature of the acetic acid stream at the liquid inlet) is higher than the freezing point of acetic acid. In certain embodiments as otherwise described herein, the third temperature is at least 20° C., e.g., at least 22° C., or at least 24° C. In certain embodiments as otherwise described herein, the third temperature is in the range of 18° C. to 50° C., e.g. in the range of 18° C. to 45° C., or 18° C. to 40° C., or 20° C. to 50° C., or 20° C. to 45° C., or 20° C. to 40° C., or 22° C. to 50° C., or 22° C. to 45° C., or 22° C. to 40° C., or 24° C. to 50° C., or 24° C. to 45° C., or 24° C. to 40° C.

The third temperature (i.e., of the acetic acid stream) can conveniently be set to be the about the same as or higher than the first temperature (i.e., of the methanol stream). For example, in certain embodiments as otherwise described herein, the third temperature differs from first temperature by at most 5° C. (e.g., at most 3.5° C., or at most 2° C.). Of course, the process can also be advantageously run with higher temperature differences; in other embodiments, the third temperature is 5-25° C. (e.g., 7.5-25° C., or 10-25° C., or 15-25° C., or 5-15 C, or 7.5-15° C., or 10-15° C.) higher than the first temperature.

Off-gas generated from the reaction zone is commonly referred to as high-pressure off-gas. Off-gas generated in a flash zone generally passes into the light ends recovery section and is removed therefrom. The light ends recovery section typically includes a light ends column, a condenser section comprising one or more condensers and a phase separation vessel (decanter). Off-gas produced from the light ends recovery section may be off-gas withdrawn from the condenser section and/or withdrawn from the decanter.

Off-gas produced from the light ends recovery section is commonly referred to as low pressure off-gas.

Streams of high pressure and low pressure off-gas may be combined to generate a low-pressure off-gas.

In some or all embodiments as otherwise described herein, off-gas to be scrubbed is a low-pressure off-gas.

Methyl iodide is typically present in the off-gases to be scrubbed as described herein, typically as entrained and/or evaporated methyl iodide. Off-gas to be scrubbed as described herein can vary widely in its content of methyl iodide, for example methyl iodide may be present in the off-gas in an amount of from about 1 mol % to about 20 mol %.

In addition to methyl iodide, the off-gas may comprise one or more non-condensable components, for example carbon monoxide, inert gases, such as nitrogen and reaction by-product gases such as hydrogen, carbon dioxide and methane. The off-gas may also contain at least one of acetic acid, methyl acetate and water.

The acetic acid production unit described herein is a unit that produces at least acetic acid, and encompasses units that co-produce acetic acid and acetic anhydride. The person of ordinary skill in the art will appreciate that a variety of acetic acid production units can be configured to perform the scrubbing methods described herein. Typically, an acetic acid production unit includes a reaction zone (e.g., including a reactor) and a light ends recovery zone (e.g., including a light ends column) configured to recover acetic acid. Other reaction zones and recovery zones can be present. For example, a flash zone is typically employed between the reaction zone and the light ends recovery zone. Off-gas streams from any part of the acetic acid production unit can be scrubbed as described herein. Production equipment for manufacture of acetic acid, e.g., by the carbonylation of methanol and/or a reactive derivative thereof with carbon monoxide in the presence of a Group VIII metal catalyst, and the operation thereof are familiar to the person of ordinary skill in the art.

In the acetic acid production processes described herein, methanol and/or reactive derivatives thereof can be introduced into the reaction zone as liquid reactants (i.e., to form a liquid reaction composition in the reaction zone). For example, in certain desirable embodiments of the processes otherwise described herein, methanol is introduced into the reaction zone as a reactant. In other processes as otherwise described herein, one or more reactive derivatives are introduced into the reaction zone as a reactant, or a combination of methanol together with one or more reactive derivatives of methanol are introduced into the reaction zone as reactants. As used herein, "reactive derivatives" of methanol are methyl acetate, dimethyl ether and methyl iodide. In certain embodiments as otherwise described herein, methanol and/or methyl acetate are used as liquid reactants. In one embodiment as otherwise described herein, methanol is used as a reactant; in another embodiment as otherwise described herein, methyl acetate is used as a reactant; and in yet another embodiment as otherwise described herein, a mixture of methanol and methyl acetate is used as reactants.

The processes described herein can employ a variety of carbonylation catalysts, e.g., a group VIII noble metal carbonylation catalyst. The catalyst can include a group VIII species supported on an inert support, e.g., a carbon support. In certain desirable embodiments as otherwise described herein, the carbonylation catalyst comprises rhodium, iridium or mixtures thereof. In one particular embodiment of the present invention, the carbonylation catalyst is iridium. In another particular embodiment as otherwise described herein, the carbonylation catalyst is a rhodium catalyst. A catalyst promotor may optionally be present, for example, selected from alkali metal iodides (e.g., lithium iodide), alkaline earth metal iodides, aluminum group metal iodides, organic iodide salts, ruthenium, osmium, rhenium, and mixtures thereof. Where the catalyst is a rhodium catalyst, the optional carbonylation catalyst promoter may desirably be selected from the alkali metal iodides, for example lithium iodide, alkaline earth metal iodides, aluminum group metal iodides and/or organic iodide salts, and mixtures thereof. Where the catalyst is an iridium catalyst, the optional carbonylation catalyst promoter may desirably be selected from the group consisting of ruthenium, osmium, rhenium, and mixtures thereof.

Where the carbonylation catalyst is an iridium catalyst, the iridium catalyst can include any iridium-containing compound that is substantially soluble in the liquid reaction composition. The iridium catalyst can be added to the liquid reaction composition in any suitable form that substantially dissolves in the liquid reaction composition or is convertible to a soluble form. The iridium catalyst is desirably used as a chloride free compound, e.g., an acetate, soluble in one or more of the liquid reaction composition components (e.g., water and/or acetic acid) and so may be added to the reaction as solutions therein. Examples of suitable iridium-containing compounds which can be added to the liquid reaction composition include $IrCl_3$, $IrI_3$, $IrBr_3$, $[Ir(CO)_2I]_2$, $[Ir(CO)_2Cl]_2$, $[Ir(CO)_2Br]_2$, $[Ir(CO)_4I_2]^-H^+$, $[Ir(CO)_2Br_2]^-H^+$, $[Ir(CO)_2I_2]^-H^+$, $[Ir(CH_3)I_3(CO)_2]^-H^+$, $Ir_4(CO)_{12}$, $IrCl_3 \cdot 4H_2O$, $IrBr_3 \cdot 4H_2O$, $Ir_3(CO)_{12}$, iridium metal, $Ir_2O_3$, $IrO_2$, $Ir(acac)(CO)_2$, $Ir(acac)_3$, iridium acetate, $[Ir_3O(OAc)_6(H_2O)_3][OAc]$, and hexachloroiridic acid $H_2[IrCl_6]$, desirably chloride-free complexes of iridium such as acetates, oxalates and acetoacetates.

When present, the concentration of the iridium catalyst in a liquid reaction composition in the reaction zone can be, e.g., independently in the range 100 to 6000 ppm by weight of iridium.

When the carbonylation catalyst is an iridium catalyst, the carbonylation catalyst promoter is desirably ruthenium. The promoter can include any ruthenium-containing compound that is substantially soluble in the liquid reaction composition. The ruthenium promoter can be added to the liquid reaction composition in any suitable form that substantially dissolves in the liquid reaction composition or is convertible to soluble form. The ruthenium promoter compound is desirably used as a chloride free compound, e.g., an acetate, soluble in one or more of the liquid reaction composition components (e.g., water and/or acetic acid) and so may be added to the reaction as solutions therein.

Examples of suitable ruthenium-containing compounds which may be used include ruthenium (III) chloride, ruthenium (III) chloride trihydrate, ruthenium (IV) chloride, ruthenium (III) bromide, ruthenium (III) iodide, ruthenium metal, ruthenium oxides, ruthenium (III) formate, $[Ru(CO)_3I_3]^-H^+$, tetra(aceto)chlororuthenium (II, III), ruthenium (III) acetate, ruthenium (III) propionate, ruthenium(III) butyrate, ruthenium pentacarbonyl, triruthenium dodecacarbonyl and mixed ruthenium halocarbonyls such as dichlorotricarbonylruthenium (II) dimer, dibromotricarbonylruthenium (II) dimer, and other organoruthenium complexes such as tetrachlorobis(4-cymene)diruthenium (II), tetrachlorobis(benzene)diruthenium (II), dichloro(cycloocta-1,5-diene)ruthenium (II) polymer and tris(acetylacetonate)ruthenium (III). Desirably, the ruthenium-containing compounds are free of impurities which provide or generate in-situ ionic iodides which may inhibit the reaction, for example, alkali or alkaline earth metal or other metal salts.

The ruthenium promoter can be present in any effective amount up to the limit of its solubility in the liquid reaction composition, the liquid fraction and/or any liquid process streams recycled to the carbonylation reaction zones. For example, the ruthenium promoter is suitably present in the liquid reaction composition at a molar ratio of each ruthenium promoter:iridium in the range [0.1 to 100]:1, preferably [greater than 0.5]:1, more preferably [greater than 1]:1 and preferably [up to 20]:1 more preferably [up to 15]:1 and yet more preferably [up to 10]:1. The concentration of ruthenium promoter in the liquid reaction composition in the reaction zone is typically less than 6000 ppm. Suitable promoter concentrations range from, for example, 400 to 5000 ppm, such as 2000 to 4000 ppm.

Suitable rhodium carbonylation catalysts are described, for example, in EP-A-0 161 874, U.S. Pat. No. 6,211,405 and EP-A-0728727, each of which is hereby incorporated herein by reference in its entirety. Where the carbonylation catalyst is a rhodium catalyst, the rhodium catalyst concentration in the liquid reaction composition is preferably in the range 50 to 5000 ppm, preferably 100 to 1500 ppm by weight of rhodium. Where rhodium is used as the catalyst, an alkali metal iodide, such as lithium iodide is preferably used as the promoter, as described, for example, in the references cited above.

Thus, in certain embodiments, homogeneous carbonylation of methanol and/or a reactive derivative thereof by carbon monoxide is catalyzed by a soluble Group VIII metal carbonylation catalyst (e.g., comprising rhodium and/or iridium) in a liquid reaction composition including the methanol and/or the reactive derivative thereof. In certain embodiments, the liquid reaction composition includes water and one or more of methyl iodide and methyl acetate. In certain such embodiments, the liquid reaction composition further comprises propionic acid by-product.

As described above, water can be present in the liquid reaction composition. The person of ordinary skill in the art will appreciate that water is formed in situ in the liquid reaction composition by an esterification reaction between methanol and/or reactive derivative thereof and acetic acid product. In certain embodiments, water can also be introduced to the reaction zone (e.g., together with, or separately from other components of the liquid reaction composition). In certain desirable embodiments, water is present in the liquid reaction composition in an amount within the range of 0.1 wt. % to 15 wt. %, e.g., within the range of 1 wt. % to 15 wt. %, or within the range of 1 wt. % to 8 wt. %.

Methyl acetate may be formed in situ in the liquid reaction composition by the reaction of methanol and/or reactive derivative thereof with the acetic acid product or solvent. In certain embodiments as otherwise described herein the concentration of methyl acetate in the liquid reaction composition in the reaction zone is in the range 2 to 50 wt %, for example, 3 to 35 wt %.

As described above, propionic acid by-product can also be present in the liquid reaction composition. In certain embodiments, propionic acid is present in the liquid reaction composition in an amount within the range of 200 ppmw to 2,500 ppmw, e.g., within the range of 400 ppmw to 2,000 ppmw, or within the range of 600 ppmw to 1,400 ppmw.

In certain desirable embodiments, methyl iodide is present in the liquid reaction composition in an amount within the range of 1 wt. % to 20 wt. %. For example, in certain such embodiments, methyl iodide is present in the liquid reaction composition in an amount within the range of 2 wt. % to 16 wt. %.

In certain embodiments as otherwise described herein, the liquid reaction composition comprises a solvent. For example, in certain such embodiments, the liquid reaction composition comprises an acetic acid solvent (e.g., recycled from a separation zone of the acetic acid production unit).

As described above, acetic acid can be produced in the reaction zone by carbonylation of methanol and/or a reactive derivative thereof with carbon monoxide. In certain embodiments as otherwise described herein, the carbon monoxide provided to the reaction zone is essentially pure. In other embodiments, the carbon monoxide provided to the reaction zone contains one or more impurities such as, for example, carbon dioxide, methane, nitrogen, hydrogen, or noble gases. In certain embodiments as otherwise described herein, the partial pressure of carbon monoxide (e.g., in a reactor of the reaction zone) is within the range of 1 bar to 70 bar, e.g., within the range of 1 bar to 35 bar.

In certain embodiments as otherwise described herein, the carbonylation reaction in the reaction zone is conducted at a total pressure (e.g., in a reactor of the reaction zone) within the range of 10 barg to 100 barg.

The effluent of the reaction zone can be conducted to a flash separation zone (e.g., by a flashing valve 62), where it is separated into a gaseous stream rich and acetic acid and a liquid stream lean in acetic acid. The liquid stream can be introduced (i.e. as recycle) to the reaction zone. For example, referring to FIG. 1, the effluent 50 is conducted to a flash separation zone 60 to form a vapour fraction 70 and a liquid fraction 75. At least a portion of the liquid fraction 75 can be introduced to the reaction zone 10.

Flash separation zones are known in the art. The flash separation zone can in certain embodiments include an adiabatic flash vessel. Alternatively or additionally, the flash separation zone can be heated, e.g., by a heater. The flash separation zone can typically be operated at a pressure in the range of 0 to 10 barg, preferably 0 to 3 barg.

The carbonylation process as described herein can be conducted as a batch process or as a continuous process. In certain desirable embodiments, the carbonylation process is conducted as a continuous process.

In certain embodiments, at least a portion of the vapour fraction of the flash separation zone is conducted to a light ends recovery zone of the acetic acid production unit. In certain embodiments, the light ends recovery zone of the acetic acid production unit is configured to separate at least the components (e.g., of the vapour fraction withdrawn from the tank, as otherwise described herein) that are more volatile than acetic acid, from acetic acid. For example, in certain embodiments, acetic acid is produced in the reaction zone by carbonylation of methanol and/or a reactive derivative thereof with carbon monoxide in the presence of a Group VIII metal catalyst system, and the light ends recovery zone of the acetic acid production unit is configured to separate acetic acid and to further separate methyl iodide and methyl acetate, which can be recycled to the reaction zone.

In certain embodiments as otherwise described herein, the light ends recovery zone comprises a distillation column that separates crude acetic acid product comprising acetic acid and propionic acid from a light ends fraction including methyl iodide and methyl acetate. In certain such embodiments, the light ends recovery zone further comprises a drying column. For example, in certain embodiments as otherwise described herein, the light ends recovery zone comprises a combined light ends and drying column, in which water is removed from crude acetic acid product to form a dry acetic acid product comprising acetic acid and propionic acid. As used herein, a "dry" or "dried" stream comprising acetic acid (e.g., and optionally propionic acid) comprises water in an amount of at most 1,500 ppmw.

Suitable columns which may be employed in the light ends recovery zone, and configurations thereof, are generally known in the art. Typically, at least a first fraction comprising acetic acid and propionic acid, and an overhead vapour fraction comprising methyl acetate, water, acetic acid, carbon monoxide, and methyl iodide are formed in the light ends recovery zone. In certain embodiments, the separated water can be recycled to the reaction zone, or removed from the acetic acid production unit.

In certain embodiments as otherwise described herein, the light ends recovery zone further comprises one or more condensers and/or coolers to condense the overhead vapour fraction and form a liquid fraction. The person of ordinary skill in the art will appreciate that any suitable method known in the art to condense the overhead vapour fraction to the liquid phase can be employed. For example, in certain embodiments, the fraction is condensed using at least one heat exchanger (e.g., supplied with water as cooling medium). Components of the overhead fraction that are not condensed (e.g., carbon monoxide, carbon dioxide, inert gases, reaction by-product gases) are removed from the light ends recovery zone as an off-gas stream. In certain embodiments, acetic acid is produced in the reaction zone by carbonylation of methanol and/or a reactive derivative thereof with carbon monoxide in the presence of a Group VIII metal catalyst system, and the off-gas stream removed from the light ends recovery zone further comprises methyl iodide (e.g., present as entrained and/or evaporated methyl iodide), methyl acetate, and water.

In certain embodiments, the liquid fraction formed in the light ends recovery zone comprises methyl acetate, water, and acetic acid. In certain embodiments, acetic acid is produced in the reaction zone by carbonylation of methanol and/or a reactive derivative thereof with carbon monoxide in the presence of a Group VIII metal catalyst system, and the liquid fraction further comprises methyl iodide. In certain embodiments, the liquid fraction further comprises entrained or dissolved gaseous components (e.g., carbon monoxide, carbon dioxide, inert gases).

In certain embodiments as otherwise described herein, the light ends recovery zone comprises a decanter, in which the liquid fraction is separated into two layers: a lower (e.g., organic) layer comprising methyl acetate and an upper (e.g., aqueous) layer comprising water. In certain embodiments, acetic acid is produced in the reaction zone by carbonylation of methanol and/or a reactive derivative thereof with carbon monoxide in the presence of a Group VIII metal catalyst system, and the lower layer further comprises methyl iodide. In certain embodiments, at least a portion (e.g., all) of the upper layer from the decanter is returned to a distillation column of the light ends recovery zone, as a reflux stream. In certain embodiments, at least a portion (e.g., all) of the upper layer from the decanter is recycled to the reaction zone. In certain embodiments, off-gas is withdrawn from the decanter and transferred to an off-gas scrubbing unit (e.g., before disposal).

In certain embodiments, a stream comprising acetic acid and propionic acid from the light ends recovery section (e.g., the first fraction formed in the light ends recovery section) is transferred to a heavy ends column through a feed inlet positioned at an intermediate point in the column. In such embodiments, a stream comprising propionic acid is withdrawn from the heavy ends column through a heavy product outlet, and acetic acid is removed as a product stream at one or more outlets of the column (e.g., as an overhead stream from an outlet at the top of the column, as a side draw stream from an outlet positioned higher than the feed inlet). In certain embodiments, the product stream comprises essentially acetic acid, and comprises less than 400 ppmw, or less than 300 ppmw, or less than 250 ppmw of propionic acid. In certain embodiments, the product stream comprises essentially acetic acid, and comprises less than 1,500 ppmw of water. In certain desirable embodiments, the product stream comprises essentially acetic acid, and comprises less than 1,500 ppmw of a combined total of propionic acid and water. Suitable columns which may be employed as a heavy ends column, and configurations thereof, are generally known in the art. For example, in certain embodiments, the heavy ends column is connected to a condenser. In another example, in certain embodiments, a reboiler is connected to the base of the heavy ends column.

EXAMPLES

The present invention may be illustrated by the following Examples, in which the performance of the absorption column as shown in FIG. 1 has been modelled in AspenPlus v10.

Example 1. Acetic Acid

An off-gas composition 142 from an acetic acid production process comprising carbon monoxide, carbon dioxide, nitrogen and methyl iodide is introduced to the absorption column 110, in which it is contacted with an acetic acid stream. The acetic acid stream comprises a mixture of acetic acid from the heavy ends column 195 and from an acetic acid storage vessel (not shown). The acetic acid stream is introduced through liquid inlet 134 at an inlet temperature of 24° C. Liquid acetic acid comprising absorbed methyl iodide is removed from the column through liquid outlet 126 and recycled to the light-ends recovery zone 190. Under these conditions the overhead stream from the absorption column comprises carbon monoxide (and carbon dioxide and nitrogen) and approximately 90 ppmv methyl iodide, representing a molar methyl iodide flow out ratio (ratio of mole fraction of methyl iodide in the vapour outlet versus the methyl iodide in the inlet off-gas) of 0.000430%.

Example 2. Methanol

Example 1 was repeated except that instead of using acetic acid, a liquid stream comprising methanol was used. The stream was introduced through liquid inlet 132 at a temperature 24° C. (i.e. the same temperature as the liquid inlet in Example 1), and all other conditions (off-gas composition, pressure, temperature, and all flow rates) were kept the same. Liquid methanol comprising absorbed methyl iodide is removed from the column through liquid outlet 124 and recycled to the reaction zone 160. Under these conditions the overhead stream from the absorption column 110 comprises carbon monoxide and approximately 10 ppmv methyl iodide, representing a molar flow out ratio (vapour out/vapour in) of 0.000044%.

This Example shows that, even at 24° C., i.e. a much higher temperature than conventionally used for methanol as the absorption liquid, effective methyl iodide removal from the off-gas is obtained.

Example 3—Switch from Acetic Acid to Methanol

In this Example, the absorption column is operated initially under the conditions of Example 1. This could represent, for example, a "start-up" where insufficient methanol was initially present in overheads condenser 165 for use in the absorption column. Subsequently it is desired to switch from use of acetic acid to methanol. In this Example the liquid feed is transitioned from use of solely acetic acid (through inlet 134) to use of solely methanol (through inlet 132). During the intermediate period liquid was introduced through both inlets and therefore the liquid stream in the absorption column was a mixture of acetic acid and methanol.

During the transition the overall liquid flow rate was kept constant, such that the final conditions are identical to those of Example 2. In this case the methyl iodide reduced steadily during the transition as shown in the following Table 1.

TABLE 1

| Scenario | MeI molar flow ratio (%) (Vapour out/Vapour in) |
|---|---|
| AcOH only | 0.000430 |
| 50/50 MeOH/AcOH | 0.000159 |
| MeOH only | 0.000044 |

This shows that it is possible to transition, without changing temperature during the transition, and obtain low levels of methyl iodide in the off-gas stream throughout. Once the liquid stream had been transitioned to methanol, the liquid outlet from the column was switched from outlet 126 to outlet 124.

Although not done in this or subsequent Examples it will be apparent that it is possible to vary the liquid flows during the transition. For example, the above results show methanol is more efficient at removing methyl iodide, so its flow rate could be reduced during or after the transition whilst still obtaining low levels of residual methyl iodide in the vapour.

Example 4—Switch from Methanol to Acetic Acid

In this Example, the absorption column is operated initially under the conditions of Example 2. (This could represent either Example 2 or Example 3 after transition.) Subsequently it is desired to switch from use of methanol to acetic acid. In this Example the acetic acid feed (to inlet 134) could be started immediately to transition the liquid feed from use of solely methanol to use of solely acetic acid. (At the start of the transition the liquid outlet from the column was also switched from outlet 126 to outlet 124.) In terms of the methyl iodide content of the overhead of the absorption column under different conditions, essentially the same results as Example 3 are obtained, albeit in reverse.

A particular advantage of the present invention and which is illustrated in this Example, is that there is no need to adjust the temperature of the absorption column prior to starting the transition, and thus the addition of acetic acid to start the transition can be started immediately.

Comparative Example 1—Switch from Methanol to Acetic Acid

The process of Example 4 was repeated except that in the initial conditions the methanol being introduced to the absorption column was being introduced at 5° C. When it was desired to switch from use of methanol to acetic acid it was necessary to first increase the temperature of the absorption column until the temperature of the column at the liquid inlet for the acetic acid (134) was above the freezing point of acetic acid. Thus, the transition could not be started immediately and took longer.

The entire contents of each and every patent and non-patent publication cited herein are hereby incorporated by reference, except that in the event of any inconsistent disclosure or definition from the present specification, the disclosure or definition herein shall be deemed to prevail.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present disclosure. Thus, where the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A process for scrubbing an off-gas stream comprising carbon monoxide and methyl iodide in an absorption column of an acetic acid production unit, the absorption column comprising
a bottom section comprising a feed inlet and one or more liquid outlets; and above the bottom section, a top section comprising one or more liquid inlets and a vapour outlet;
the process comprising
through the feed inlet, introducing the off-gas stream to the absorption column; through a liquid inlet of the one or more liquid inlets, introducing a methanol stream at a first flow rate, the methanol stream having a first temperature at the liquid inlet, the first temperature being at least 18° C.;
in the absorption column, contacting the off-gas stream with the methanol stream;
through a liquid outlet of the one or more liquid outlets, withdrawing a first liquid effluent from the absorption column, the first liquid effluent comprising methanol and methyl iodide; and
through the vapour outlet, withdrawing a vapour effluent from the absorption column,
the process further comprising separating the withdrawn vapour effluent in a heat exchanger to provide a vapour fraction and a liquid fraction comprising methanol, wherein
the vapour fraction comprises at most 2.5 wt % methanol, and
the methanol stream includes at least a portion of the liquid fraction comprising methanol;
the process further comprising, after introducing the methanol stream to the absorption column,
decreasing the flow rate of methanol transferred to the absorption column;
through a liquid inlet of the one or more liquid inlets, transferring an acetic acid stream to the top section of the column at a third flow rate, the acetic acid stream having a third temperature at the inlet; and
in the absorption column, contacting the off-gas stream with the acetic acid stream:
wherein the third temperature is in the range 18° C. to 40° C.
and wherein the third temperature differs from the first temperature by at most 5° C.

2. The process of claim 1, wherein the vapour effluent withdrawn while introducing the methanol stream to the absorption column comprises at most 500 ppmv methyl iodide.

3. The process according to claim 1, further comprising transferring the first liquid effluent to a reaction zone of the acetic acid production unit.

4. The process according to claim 3, wherein liquid effluent transferred to the reaction zone of the acetic acid production unit comprises at most 250 ppmv acetic acid.

5. The process according to claim 1, further comprising, before introducing the methanol stream to the absorption column,
through the feed inlet, transferring the off-gas stream to the bottom section of the absorption column;
through a liquid inlet of the one or more liquid inlets, introducing an acetic acid stream to the top section of the absorption column at a second flow rate, the acetic acid stream having a second temperature at the liquid inlet; and
in the absorption column, contacting the off-gas stream with the acetic acid stream;

the method further comprising, after a first time period of contacting the off-gas stream with the acetic acid stream,
  decreasing the flow rate of the acetic acid stream and introducing the methanol stream to the absorption column, to transition from acetic acid to methanol;
and wherein the second temperature is at least 18° C. and wherein the second temperature differs from the first temperature by at most 5° C.

6. The process of claim 5, further comprising, while introducing the acetic acid stream to the absorption column, withdrawing a second liquid effluent from the absorption column through a liquid outlet of the one or more liquid outlets, the second liquid effluent comprising acetic acid and methyl iodide.

7. The process of claim 6, wherein the second liquid effluent is transferred to a light-ends recovery zone of the acetic acid production unit.

8. The process of claim 7, wherein the second liquid effluent transferred to the light-ends recovery zone of the acetic acid production unit comprises at least 25 ppmv acetic acid.

9. The process of claim 5, further comprising, while introducing the acetic acid stream to the absorption column, withdrawing a vapour effluent from the absorption column through the vapour outlet, wherein the vapour effluent withdrawn while introducing the acetic acid stream to the absorption column comprises at most 500 ppmv methyl iodide.

10. The process of claim 5, wherein the acetic acid stream includes at least a portion of an overhead stream of a heavy ends column of the acetic acid production unit.

11. The process of claim 5, wherein, after the transition, the weight ratio of methanol to acetic acid in the absorption column is at least 500:1 while contacting the off-gas stream with the methanol stream.

12. The process of claim 5, wherein the second temperature is in the range of 18-30° C.

13. The process of claim 1, wherein the first temperature is in the range of 18-30° C.

14. The process of claim 1, wherein the off-gas stream includes at least a portion of one or more of a vapour-phase effluent of a separation zone, a light-ends recovery zone of the acetic acid production unit, and a reaction zone of the acetic acid production unit.

15. The process of claim 1, further comprising transferring the vapour fraction to a combustion system and burning the fraction in the combustion system.

16. The process of claim 2, wherein the vapour effluent withdrawn while introducing the methanol stream to the absorption column comprises at most 200 ppmv methyl iodide.

17. The process of any of claim 1 wherein the first temperature is in the range 20° C. to 35° C.

18. The process of claim 1 wherein the third temperature is in the range 20° C. to 40° C.

19. The process of claim 1, wherein the vapour fraction comprises at most 1.5 wt. % methanol.

20. The process of claim 1 wherein the flow rate of methanol transferred to the absorption column is decreased to zero.

21. The process of claim 13 wherein the third temperature differs from the first temperature by at most 2° C.

* * * * *